United States Patent
Alvarez Arevalo et al.

(10) Patent No.: US 7,912,974 B2
(45) Date of Patent: Mar. 22, 2011

(54) TRANSMITTING OVER A NETWORK

(75) Inventors: Roberto Alvarez Arevalo, Ipswich (GB); Rory S Turnbull, Ipswich (GB); Matthew D Walker, Ipswich (GB)

(73) Assignee: British Telecommunications public limited company, London (GB)

( * ) Notice: Subject to any disclaimer, the term of this patent is extended or adjusted under 35 U.S.C. 154(b) by 386 days.

(21) Appl. No.: 10/549,912

(22) PCT Filed: Mar. 23, 2004

(86) PCT No.: PCT/GB2004/001253
§ 371 (c)(1),
(2), (4) Date: Sep. 20, 2005

(87) PCT Pub. No.: WO2004/086721
PCT Pub. Date: Oct. 7, 2004

(65) Prior Publication Data
US 2006/0195612 A1    Aug. 31, 2006

(30) Foreign Application Priority Data
Mar. 26, 2003 (GB) .................................. 0306973.9

(51) Int. Cl.
*G06F 15/16* (2006.01)
(52) U.S. Cl. ........................................ 709/231; 709/232
(58) Field of Classification Search .................. 709/217, 709/219, 230, 231
See application file for complete search history.

(56) References Cited

U.S. PATENT DOCUMENTS

| | | | |
|---|---|---|---|
| 4,419,699 A | | 12/1983 | Christopher et al. |
| 5,025,458 A | * | 6/1991 | Casper et al. ............. 375/365 |
| 5,430,485 A | | 7/1995 | Lankford et al. |
| 5,534,937 A | * | 7/1996 | Zhu et al. ............. 375/240.27 |
| 5,598,352 A | | 1/1997 | Rosenau et al. |

(Continued)

FOREIGN PATENT DOCUMENTS

CN    1426235    6/2003

(Continued)

OTHER PUBLICATIONS

Hwang et al., "ITU-T Recommendation H.261 Video Coder-Decoder", 1997, Digital Consumer Electronics Handbook, XX, XX, pp. 1001-1026, I, XP001059410.

(Continued)

*Primary Examiner* — Joseph E Avellino
*Assistant Examiner* — Marshall McLeod
(74) *Attorney, Agent, or Firm* — Nixon & Vanderhye P.C.

(57) ABSTRACT

Data for presentation in real time, such as a video or audio sequence, is available on different encoded versions having different degrees Of compression. In order to assess, during transmission of one version, the feasibility of switching to another version, given the data rate known to be available at the time, a server computes, for a candidate version, in respect of at least one portion thereof that has not yet been sent, the maximum value of a timing error that would occur if any number of portions starting with that portion to be sent at the available rate. The selection of the same or a different version for continuing transmission is taken in dependence on a comparison between the computed error and the current state of a receiving buffer. Error values may be computed in advance for a range of transmitting rates, stored and later retrieved for use in estimating an error value corresponding to the actual transmitting rate.

16 Claims, 2 Drawing Sheets

U.S. PATENT DOCUMENTS

| | | | |
|---|---|---|---|
| 5,768,527 A | 6/1998 | Zhu et al. | |
| 5,874,997 A | 2/1999 | Haigh | |
| 5,923,655 A | 7/1999 | Veschi et al. | |
| 5,949,410 A | 9/1999 | Fung | |
| 5,953,350 A | 9/1999 | Higgins | |
| 6,014,694 A * | 1/2000 | Aharoni et al. | 709/219 |
| 6,016,307 A | 1/2000 | Kaplan et al. | |
| 6,085,221 A | 7/2000 | Graf | |
| 6,101,221 A | 8/2000 | Varanasi et al. | |
| 6,130,987 A | 10/2000 | Tanaka | |
| 6,148,135 A | 11/2000 | Suzuki | |
| 6,169,843 B1 | 1/2001 | Lenihan et al. | |
| 6,195,368 B1 | 2/2001 | Gratacap | |
| 6,223,211 B1 | 4/2001 | Hamilton et al. | |
| 6,332,157 B1 | 12/2001 | Mighdoll et al. | |
| 6,366,614 B1 * | 4/2002 | Pian et al. | 375/240.02 |
| 6,397,251 B1 | 5/2002 | Graf | |
| 6,438,317 B1 | 8/2002 | Imahashi et al. | |
| 6,452,922 B1 | 9/2002 | Ho | |
| 6,453,112 B2 | 9/2002 | Imahashi et al. | |
| 6,502,125 B1 | 12/2002 | Kenner et al. | |
| 6,560,334 B1 | 5/2003 | Mullaney et al. | |
| 6,678,332 B1 | 1/2004 | Faibish et al. | |
| 6,704,288 B1 | 3/2004 | Dziekan et al. | |
| 6,771,703 B1 | 8/2004 | Oguz et al. | |
| 6,792,047 B1 | 9/2004 | Bixby et al. | |
| 6,931,071 B2 | 8/2005 | Haddad et al. | |
| 6,976,208 B1 | 12/2005 | Kim et al. | |
| 7,016,970 B2 | 3/2006 | Harumoto et al. | |
| 7,096,481 B1 | 8/2006 | Forecast et al. | |
| 7,111,061 B2 | 9/2006 | Leighton et al. | |
| 7,251,833 B2 | 7/2007 | Feig et al. | |
| 7,333,721 B2 | 2/2008 | Maehashi et al. | |
| 7,340,505 B2 | 3/2008 | Lisiecki et al. | |
| 7,471,874 B2 | 12/2008 | Kanemaru et al. | |
| 7,558,869 B2 | 7/2009 | Leon et al. | |
| 7,620,137 B2 | 11/2009 | Lottis et al. | |
| 2002/0031120 A1 | 3/2002 | Rakib | |
| 2002/0100052 A1 | 7/2002 | Daniels | |
| 2002/0102978 A1 | 8/2002 | Yahagi | |
| 2002/0136205 A1 | 9/2002 | Sasaki | |
| 2003/0002482 A1 * | 1/2003 | Kubler et al. | 370/352 |
| 2003/0053416 A1 | 3/2003 | Ribas-Corbera et al. | |
| 2003/0145007 A1 | 7/2003 | Kenner et al. | |
| 2003/0169777 A1 | 9/2003 | Fuse | |
| 2003/0233666 A1 | 12/2003 | Onomatsu et al. | |
| 2004/0141731 A1 | 7/2004 | Ishioka et al. | |
| 2005/0071876 A1 | 3/2005 | van Beek | |
| 2005/0117891 A1 | 6/2005 | Suzuki | |
| 2008/0025340 A1 | 1/2008 | Alvarez-Arevalo | |

FOREIGN PATENT DOCUMENTS

| | | | |
|---|---|---|---|
| DE | 10125017 A1 | 12/2002 | |
| EP | 0817488 A2 | 1/1998 | |
| EP | 0868084 A1 | 9/1998 | |
| EP | 0966175 A2 | 12/1999 | |
| WO | WO 95/22233 | 8/1995 | |
| WO | WO 99/65026 | 12/1999 | |
| WO | WO 01/89142 A2 | 11/2001 | |
| WO | WO 02/49343 A1 | 6/2002 | |
| WO | WO 02/095637 A2 | 11/2002 | |

OTHER PUBLICATIONS

Anastasiadis et al., "Server-Based Smoothing of Variable Bit-Rate Streams", ACM Multimedia, 2001, pp. 147-158.

Zimmermann et al., "A Multi-Threshold Online Smoothing Technique for Variable Rate Multimedia Streams" (Abstract only—paper is not due to be published until 2006) at http://idefix.usc.edu/pubs/mtfc.html.

Mohan et al., "Adapting Multimedia Internet Content for Universal Access", IEEE Transactions on Multimedia, vol. 1, No. 1, Mar. 1999, pp. 104-114.

Makaroff et al., "An Evaluation of VBR Disk Admission Algorithms for Continuous Media File Servers", Proc. of ACM Multimedia '97, Seattle, 1997.

International Search Report, Appln. PCT/GB2005/001011, dated May 20, 2005.

UK Search Report, Appln. GB0406901.9, dated Aug. 3, 2004.

Guojun Lu et al, "An Efficient Communication Scheme for Media On-Demand Services with Hard QoS Guarantees", Journal of Network and Computer Applications, 'Online!, vol. 21, No. 1, Jan. 19998, pp. 1-15, XP002328926.

Yeom et al, "An Efficient Transmission Mechanism for Stored Video", Protocols for Multimedia Systems—Multimedia Networking, 1997, Proceedings, IEEE Conference on Santiago, Chile Nov. 24-27, 1997, Los Alamitos, CA, USA, IEEE Comput. Soc., US, Nov. 24, 1997, pp. 122-130, XP010258820.

McManus et al., "Video-On-Demand Over ATM: Constant-Rate Transmission and Transport", IEEE Journal on Selected Areas in Communications, IEEE Inc., New York, US, vol. 14, No. 6, Aug. 1, 1996, pp. 1087-1098, XP000608049.

International Search Report, Appln. No. PCT/GB2004/003331, dated Sep. 28, 2004.

UK Search Report, Appln. No. GB 0319251.5, dated Dec. 16, 2003.

Office Action issued in Chinese Appln. No. 200580009650.1.

Office Action issued in European Appln. No. 05718057.2, dated Oct. 18, 2007.

Office Action issued in U.S. Appl. No. 10/593,587 (Nov. 20, 2009).

Office Action issued in U.S. Appl. No. 10/593,587 (Mar. 3, 2009).

Office Action dated Jul. 20, 2010 issued in related U.S. Appl. No. 10/593,587.

* cited by examiner

TRANSMITTING OVER A NETWORK

This application is the U.S. national phase of international application PCT/GB2004/001253 filed 23 Mar. 2004 which designated the U.S. and claims benefit of GB 0306973.9, dated 26 Mar. 2003, the entire content of which is hereby incorporated by reference.

FIELD OF TECHNOLOGY

The present invention is concerned with methods and apparatus for transmitting encoded video, audio or other material over a network.

BACKGROUND AND SUMMARY

According to one aspect of the present invention there is provided a method of transmitting an encoded sequence over a network to a terminal, comprising: storing a plurality of encoded versions of the same sequence, wherein each version comprises a plurality of discrete portions of data and each version corresponds to a respective different degree of compression; transmitting a current one of said versions; ascertaining the data rate permitted by the network; ascertaining the state of a receiving buffer at the terminal; for at least one candidate version, computing in respect of at least one discrete portion thereof as yet unsent the maximum value of a timing error that would occur were any number of portions starting with that portion to be sent at the currently ascertained permitted rate; comparing the determined maximum error values with the ascertained buffer state; selecting one of said versions for transmission, in dependence on the results of said comparisons; and transmitting the selected version.

In another aspect, the invention provides a method of transmitting an encoded sequence over a network to a terminal, comprising: storing a plurality of encoded versions of the same sequence, wherein each version comprises a plurality of discrete portions of data and each version corresponds to a respective different degree of compression; for each version and for each of a plurality of nominal transmitting rates, computing in respect of at least one discrete portion thereof the maximum value of a timing error that would occur were any number of portions starting with that portion to be sent at the respective nominal rate; storing said maximum error values; transmitting a current one of said versions; ascertaining the data rate permitted by the network; ascertaining the state of a receiving buffer at the terminal; for at least one candidate version, using the ascertained permitted data rate and the stored maximum error values to estimate a respective maximum error value corresponding to said ascertained permitted data rate; comparing the estimated maximum error values with the ascertained buffer state; selecting one of said versions for transmission, in dependence on the results of said comparisons; and transmitting the selected version.

Further aspects of the invention are set out in the claims

BRIEF DESCRIPTION OF DRAWINGS

Some embodiments of the invention will now be described, by way of example, with reference to the accompanying drawings, in which.

DETAILED DESCRIPTION

Figure 1:
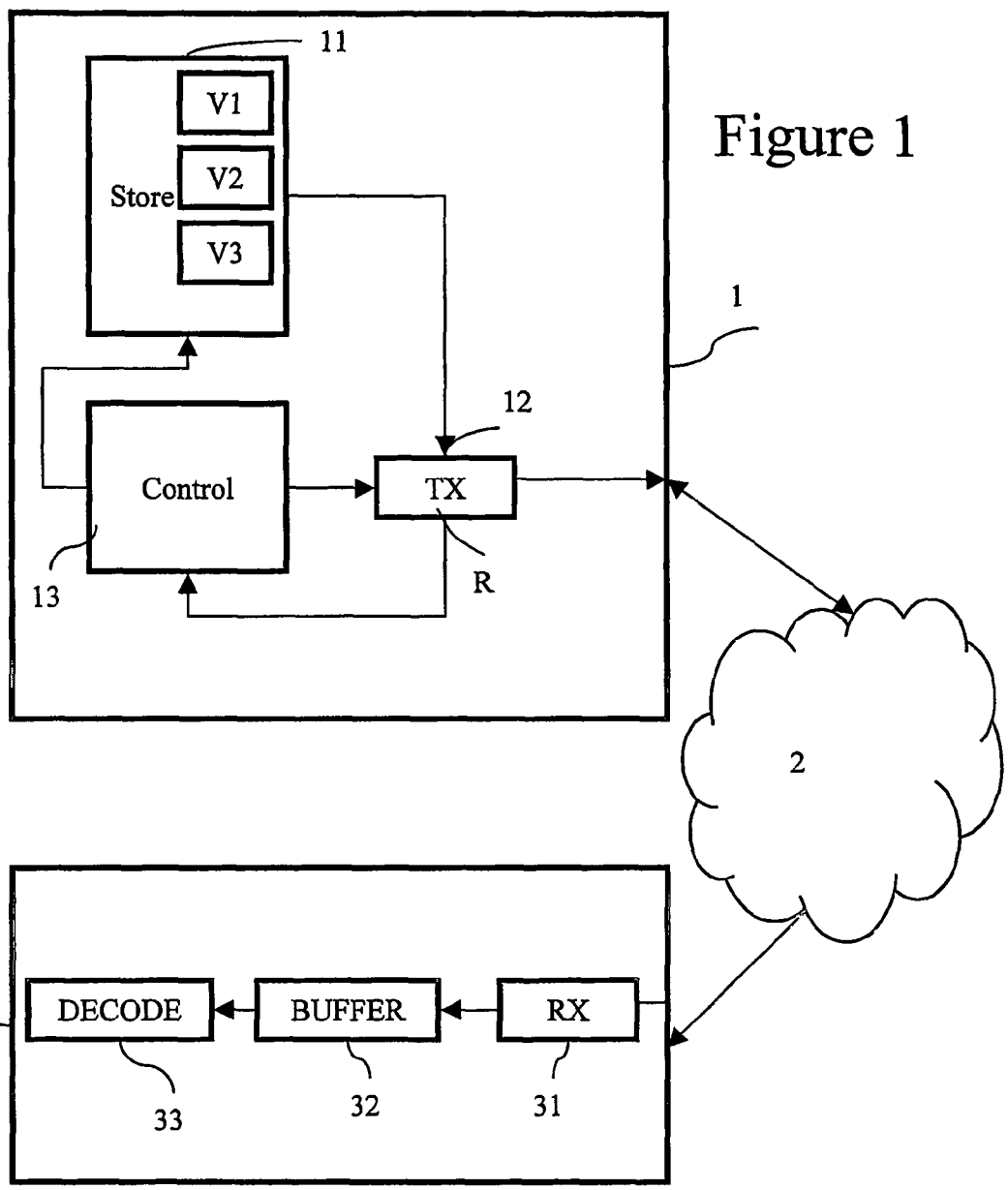
FIG. 1 is a block diagram of a transmission system embodying the invention.

In FIG. 1, a streamer 1 contains (or has access to) a store 11 in which are stored files each being a compressed version of a video sequence, encoded using a conventional compression algorithm such as that defined in the ITU standard H.261 or H.263, or one of the ISO MPEG standards. More particularly, the store 11 contains, for the same original video material, several files each encoded with a different degree of compression. In practice all the material could if desired be stored in one single file, but for the purposes of description they will be assumed to be separate files. Thus FIG. 1 shows three such files: V1, encoded with a high degree of compression and hence low bit-rate, representing a low-quality recording; V2, encoded with a lesser degree of compression and hence higher bit-rate, representing a medium-quality recording; and V3, encoded with a low degree of compression and hence even higher bit-rate, representing a high-quality recording. Naturally one may store similar multiple recordings of further video sequences, but this is not important to the principles of operation.

By "bit-rate" here is meant the bit-rate generated by the original encoder and consumed by the ultimate decoder; in general this is not the same as the rate at which the streamer actually transmits, which will be referred to as the transmitting bit-rate. It should also be noted that these files are generated at a variable bit-rate (VBR)—that is, the number of bits generated for any particular frame of the video depends on the picture content. Consequently, references above to low (etc.) bit-rate refer to the average bit-rate.

The server has a transmitter 12 which serves to output data via a network 2 to a terminal 3. The transmitter is conventional, perhaps operating with a well known protocol such as TCP/IP. A control unit 13 serves in conventional manner to receive requests from the terminal for delivery of a particular sequence, and to read packets of data from the store 11 for sending to the transmitter 12 as and when the transmitter is able to receive them. Here it is assumed that the data are read out as discrete packets, often one packet per frame of video, though the possibility of generating more than one packet for a single frame is not excluded. (Whilst is in principle possible for a single packet to contain data for more than one frame, this is not usually of much interest in practice).

Note that these packets are not necessarily related to any packet structure used on the network 2.

The terminal 3 has a receiver 31, a buffer 32, primarily for accommodating short-term fluctuations in network delay and throughput, and a decoder 33. In principle, the terminal is conventional, though to get full benefit from the use of the server, one might choose to use a terminal having a larger buffer 32 than is usual.

Some networks (including TCP/IP networks) have the characteristic that the available transmitting data rate fluctuates according to the degree of loading on the network. The reason for providing alternative versions V1, V2, V3 of one and the same video sequence is that one may choose a version that the network is currently able to support. Another function of the control unit 13, therefore, is to interrogate the transmitter 12 to ascertain the transmitting data rate that is currently available, and take a decision as to which version to send. Here, as in many such systems, this is a dynamic process: during the course of a transmission the available rate is continually monitored so that as conditions improve (or deteriorate) the server may switch to a higher (or lower) quality version. Sometimes (as in TCP/IP) the available transmitting rate is not known until after transmission has begun; one solution is always to begin by sending the lowest-rate version and switch up if and when it becomes apparent that a higher quality version can be accommodated.

Some systems employ additional versions of the video sequence representing transitional data which can be transmitted between the cessation of one version and the commencement of a different one, so as to bridge any incompatibility between the two versions. If required, this may be implemented, for example, in the manner described in our U.S. Pat. No. 6,002,440.

In this description we will concentrate on the actual decision on if and when to switch. Conventional systems compare the available transmitting bit-rate with the average bit-rates of the versions available for transmission. We have recognized, however, that this is unsatisfactory for VBR systems because it leaves open the possibility that at some time in the future the available transmitting bit-rate will be insufficient to accommodate short-term fluctuations in instantaneous bit-rate as the latter varies with picture content. Some theoretical discussion is in order at this point.

Figure 2:
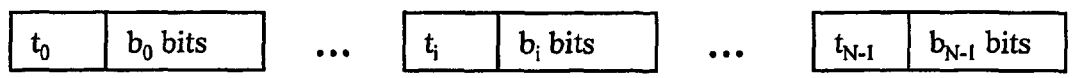
FIG. 2 is a timing diagram.

As shown in FIG. 2, an encoded video sequence consists of N packets. Each packet has a header containing a time index $t_i$ (i=0 ... N−1) (in terms of real display time—e.g. this could be the video frame number) and contains $b_i$ bits. This analysis assumes that packet i must be completely received before it can be decoded (i.e. one must buffer the whole packet first).

In a simple case, each packet corresponds to one frame, and the time-stamps $t_i$ increase monotonically, that is, $t_{i+1} > t_i$ for all i. If however a frame can give rise to two or more packets (each with the same $t_i$) then $t_{i+1} \geq t_i$. If frames can run out of capture-and-display sequence (as in MPEG) then the $t_i$ do not increase monotonically. Also, in practice, some frames may be dropped, so that there will be no frame for a particular value of $t_i$.

These times are relative. Suppose the receiver has received packet 0 and starts decoding packet 0 at time $t_{ref}+t_0$. At "time now" of $t_{ref}+t_g$ the receiver has received packet $t_g$ (and possibly more packets too) and has just started to decode packet g.

Packets g to h−1 are in the buffer. Note that (in the simple case) if h=g+1 then the buffer contains packet g only. At time $t_{ref}+t_j$ the decoder is required to start decoding packet j. Therefore, at that time $t_{ref}+t_j$ the decoder will need to have received all packets up to and including packet j.

The time available from now up to $t_{ref}+t_j$ is $(t_{ref}+t_j)-(t_{ref}+t_g)=t_j-t_g$. (1)

The data to be sent in that time are that for packets h to j, viz.

$$\sum_{i=h}^{j} b_i \quad (2)$$

which at a transmitting rate R will require a transmission duration $$\frac{\sum_{i=h}^{j} b_i}{R} \quad (3)$$

This is possible only if this transmission duration is less than or equal to the time available, i.e. when the currently available transmitting rate R satisfies the inequality $$\frac{\sum_{i=h}^{j} b_i}{R} \leq t_j - t_g \quad (4)$$

Note that this is the condition for satisfactory reception and decoding of frame j: satisfactory transmission of the whole of the remaining sequence requires that this condition be satisfied for all j=h ... N−1.

For reasons that will become apparent, we rewrite Equation (4) as:

$$\frac{\sum_{i=h}^{j} b_i}{R} - (t_j - t_{h-1}) \leq t_{h-1} - t_g \quad (5)$$

Note that $$t_j - t_{h-1} = \sum_{i=h}^{j} (t_i - t_{i-1}) = \sum_{i=h}^{j} \Delta t_i$$

where $$\Delta t_i = t_i - t_{i-1}.$$

Also, we define $\Delta\epsilon_i = (b_i/R) - \Delta t_i$
and $T_B = t_{h-1} - t_g$; note that $T_B$ is the difference between the time-stamp of the most recently received packet in the buffer and the time stamp of the least recently received packet in the buffer—i.e. the one that we have just started to decode. Thus, $T_B$ indicates the amount of buffered information that the client has at time $t_g$.

Then the condition is $$\sum_{i=h}^{j} \Delta\epsilon_i \leq T_B \quad (6)$$

For a successful transmission up to the last packet N−1, this condition must be satisfied for any possible j, viz.

$$\text{Max}_{j=h}^{j=N-1} \left\{ \sum_{i=h}^{j} \Delta\epsilon_i \right\} \leq T_B \quad (7)$$

The left-hand side of Equation (7) represents the maximum timing error that may occur from the transmission of packet h up to the end of the sequence, and the condition states, in effect that this error must not exceed the ability of the receiver buffer to accommodate it, given its current contents. For convenience, we will label the left-hand side of Equation (7) as $T_h$—i.e.

$$T_h = \text{Max}_{j=h}^{j=N-1} \left\{ \sum_{i=h}^{j} \Delta\epsilon_i \right\} \quad (8)$$

So that Equation (7) may be written as $$T_h \leq T_B \quad (9)$$

In practice we prefer to allow switching only at certain defined "switching points" in the sequence (and naturally provide the transitional data mentioned earlier only for such points). In that case the test needs to be performed only at such points.

Figure 3:
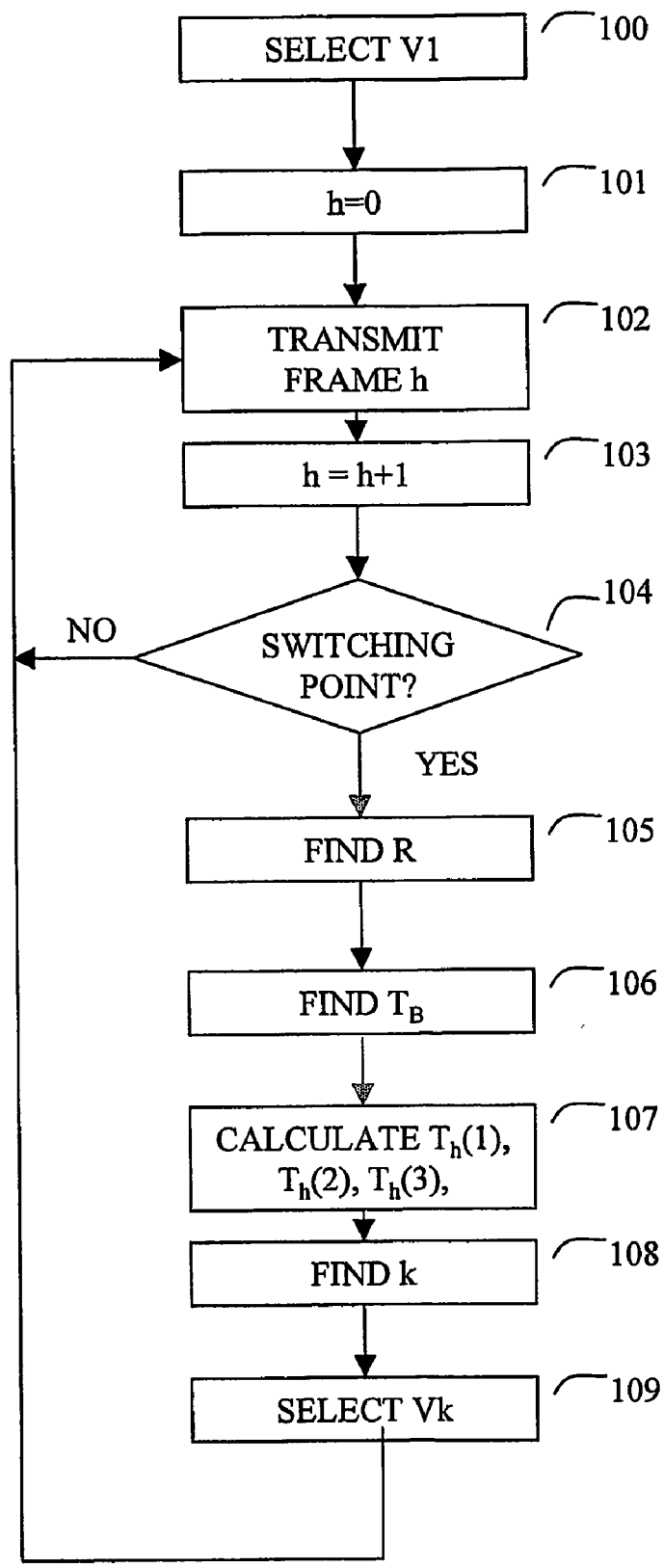
FIG. 3 is a flowchart explaining the operation of the control unit shown in FIG. 1.

FIG. 3 is a flowchart showing operation of the control unit 13 following selection of a video sequence for transmission. At step 100, a version, such as V1, is selected for transmission. The currently selected version number is stored. At step 101 a frame counter is reset. Then (102) the first frame (or on subsequent iterations, the next frame) of the currently selected version, is read from the store 11 and sent to the transmitter 12. Normally, the frame counter is incremented at 103 and control returns to step 102 where, as soon as the transmitter is ready to accept it, a further frame is read out and transmitted. If, however the frame is designated as a switching frame the fact that it contains a flag indicating this is recognized at step 104.

The switching decision at frame h may then proceed as follows:

Step 105: interrogate the transmitter 12 to determine the available transmitting rate R;

Step 106: ascertain the current value of $T_B$: this may be calculated at the terminal and transmitted to the server, or may be calculated at the server (see below);

Step 107: compute (for each file V1, V2, V3) $T_h$ in accordance with Equation (8)—let these be called $T_h(1)$, $T_h(2)$, $T_h(3)$;

Step 108: determine the highest value of k for which $T_h(k) + \Delta \leq T_B$, where $\Delta$ is a fixed safety margin;

Step 109: select file $V_k$ for transmission.

The original loop is then resumed with step 102 where the next frame is transmitted before, but possibly from a different one of the three files V1, V2, V3.

The calculation of $T_B$ at the server will depend on the exact method of streaming that is in use. Our preferred method is (as described our in international patent application no. PCT/GB 01/05246 [Agent's Ref. A26079]) to send, initially, video at the lowest quality, so that the terminal may immediately start decoding whilst at the same time the receiving buffer can be filling up because data is being sent at a higher rate than it is used. In this case the server can deduce current client session time (i.e. the timestamp of the packet currently being decoded at the terminal) without any feedback, and so $T_B$=latest sent packet time−current client session time.

If the system is arranged such that the terminal waits until some desired state of buffer fullness is reached before playing begins, then the situation is not quite so simple because there is an additional delay to take into account. If this delay is fixed, it can be included in the calculation. Similarly, if the terminal calculates when to start playing and both the algorithm used, and the parameters used by the algorithm, are known by the server, again this can be taken into account. If however the terminal is of unknown type, or controls its buffer on the basis of local conditions, feedback from the terminal will be needed.

Now, this procedure will work perfectly well, but does involve a considerable amount of processing that has to be carried out during the transmission process. In a modified implementation, therefore, we prefer to perform as much as possible of this computation in advance. In principle this involves the calculation of $T_h(k)$ for every packet that follows a switching point, and storing this value in the packet header. Unfortunately, this calculation (Equation (8) and the definition of $\Delta\epsilon_i$) involves the value of R, which is of course unknown at the time of this pre-processing. Therefore we proceed by calculating $T_h(k)$ for a selection of possible values of R, for example (if $R_A$ is the average bit rate of the file in question)

$R_1 = 0.5 R_A$ $R_2 = 0.7 R_A$ $R_3 = R_A$ $R_4 = 1.3 R_A$ $R_5 = 2 R_A$

So each packet h has these five precalculated values of $T_h$ stored in it. If required (for the purposes to be discussed below) one may also store the relative time position at which the maximum in Equation (8)) occurs, that is, $\Delta t_{h\ max} = t_{j\ max} - t_h$ where $t_{j\ max}$ is the value of j in Equation 8 for which $T_h$ is obtained.

In this case the switching decision at frame h proceeds as follows:

interrogate the transmitter 12 to determine the available transmitting rate R;

ascertain the current value of $T_B$, as before;

EITHER—in the event that R corresponds to one of the rates for which $T_h$ has been precalculated—read this value from the store (for each file V1, V2, V3);

OR—in the event that R does not so correspond, read from the store the value of $T_h$ (and, if required, $t_{h\ max}$) that correspond to the highest one ($R^-$) of the rates $R_1 \ldots R_5$ that is less than the actual value of R, and estimate $T_h$ from it (again, for each file V1, V2, V3);

determine the highest value of k for which $T_h(k) + \Delta \leq T_B$, where $\Delta$ is a fixed safety margin;

select file $V_k$ for transmission.

The estimate of $T_h$ could be performed simply by using the value $T_h^-$ associated with $R^-$; this would work, but since it would overestimate $T_h$ it would result, at times, in a switch to a higher quality stream being judged impossible even though it were possible. Another option would be by linear (or other) interpolation between the values of $T_h$ stored for the two values of $R_1 \ldots R_5$ each side of the actual value R. However, our preferred approach is to calculate an estimate according to:

$$T'_i = \frac{(T_i^- + \Delta T_{imax}^-)R^-}{R} - \Delta T_{imax}^-$$

Where $R^-$ is the highest one of the rates $R_1 \ldots R_5$ that is less than the actual value of R, $T_i^-$ is the precalculated $T_h$ for this rate, $\Delta t_{i\ max}^-$ is the time from $t_i$ at which $T_i^-$ is obtained (i.e. is the accompanying value of $\Delta t_{h\ max}^-$. In the event that this method returns a negative value, we set it to zero.

Note that this is only an estimate, as $T_h$ is a nonlinear function of rate. However with this method $T_i'$ is always higher than the true value and automatically provides a safety margin (so that the margin $\Delta$ shown above may be omitted.

Note that these equations are valid for the situation where the encoding process generates two or more packets (with equal $t_i$) for one frame, and for the situation encountered in MPEG with bidirectional prediction where the frames are transmitted in the order in which they need to be decoded, rather than in order of ascending $t_i$.

The above description assumes that the test represented by Equation (7) is performed for all versions of the stored video. Although preferred, this is not essential. If large jumps in picture quality are not expected (for example because frequent switching points are provided) then the test could be performed only for the current version and one or more versions corresponding to adjacent compression rates. For example, when transmitting version V1, it might be considered sufficient to perform the test only for the current version V1 and for the nearest candidate version V2. Also, in the case of a server that interfaces with different networks, one might choose to test only those versions with data rate requirements that lie within the expected range of capability of the particular network in use.

Although the example given is for encoded video, the same method can be applied to encoded audio or indeed any other material that is to be played in real time.

The invention claimed is:

1. A method of transmitting an encoded sequence over a network to a terminal, comprising:
   storing a plurality of encoded versions of the same sequence, wherein each version comprises a plurality of discrete portions of data and each version corresponds to a respective different degree of compression;
   transmitting a current one of said versions;
   ascertaining the data transmission rate permitted by the network;
   ascertaining the content state of a receiving buffer at the terminal;
   for at least one candidate version, computing, in respect of one or more discrete portions thereof as yet unsent, the maximum timing error value as the maximum of a set of computed timing error values for any number of portions starting with said discrete portion up to and including any particular portion if sent at the currently ascertained data transmission rate;
   comparing the computed maximum timing error values of each said at least one candidate version with the ability of the receiving buffer to accommodate the respective maximum timing error values given the ascertained buffer content state;
   selecting one of said versions for transmission, in dependence on the results of said comparisons; and
   transmitting the selected version,
   wherein a computed timing error the value for a portion up to and including the particular portion when sent at a said data transmission rate is the difference between (a) the time needed to transmit at the said data transmission rate, the said portion for which the timing error is being computed and zero or more consecutive subsequent portions up to and including the said particular portion, and (b) the difference between the playing instant of the said particular portion and the playing instant of the portion preceding the said portion for which the timing error value is being computed.

2. A method according to claim 1, in which said maximum timing error value calculation is performed only for selected ones of said portions at which a version change is to be permitted.

3. A method according to claim 1, in which the sequence is a video sequence.

4. A method according to claim 1, in which the sequence is an audio sequence.

5. A method according to claim 1, wherein a discrete data portion comprises a data packet.

6. A method according to claim 1, wherein a discrete data portion comprises a data packet and wherein a said packet has one or more pre-calculated maximum timing errors stored in it.

7. A method according to claim 1, in which said maximum timing error determination is performed only for selected ones of said portions at which a version change is to be permitted.

8. A method according to claim 1, in which the sequence is a video sequence.

9. A method according to claim 1, in which the sequence is an audio sequence.

10. A method according to claim 1, wherein a discrete data portion comprises a data packet.

11. A method according to claim 1, wherein a discrete data portion comprises a data packet and wherein a said packet has one or more pre-calculated maximum timing errors stored in it.

12. A method of transmitting an encoded sequence over a network to a terminal, comprising:
    storing a plurality of encoded versions of the same sequence, wherein each version comprises a plurality of discrete portions of data and each version corresponds to a respective different degree of compression;
    for each version and for each of a plurality of nominal data transmission rates, computing in respect of one or more discrete portions thereof the maximum timing error value as the maximum of a set of computed timing error values for any number of portions starting with the said discrete portion up to and including any particular portion if sent at a said nominal data transmission rate;
    storing said maximum timing error values;
    transmitting a current one of said versions;
    ascertaining a data transmission rate permitted by the network;
    ascertaining the content state of a receiving buffer at the terminal;
    for at least one candidate version, using the ascertained permitted data transmission rate and the stored maximum timing error values to estimate a respective maximum timing error value corresponding to said ascertained data transmission rate;
    comparing the estimated maximum timing error values of each said at least one candidate version with the ability of the receiving buffer to accommodate the respective maximum timing error given the ascertained buffer content state;
    selecting one of said candidate versions for transmission, in dependence on the results of said comparisons; and
    transmitting the selected version,
    wherein a computed timing error value for a portion up to and including the particular portion when sent at a said data transmission rate is the difference between (a) the time needed to transmit at the said data transmission rate, the said portion for which the timing error is being computed and zero or more consecutive subsequent portions up to and including the said particular portion, and (b) the difference between the playing instant of the said particular portion and the playing instant of the portion preceding the said portion for which the timing error value is being computed.

13. A non-transitory storage medium for storing a video recording comprising: a plurality of encoded versions of the same video sequence, wherein each version comprises a plurality of discrete portions of data and each version corresponds to a respective different degree of compression; and
    for each discrete portion of each version and for each of a plurality of nominal data transmission rates, a maximum timing error value for a said discrete portion, being the maximum of a set of timing error values for any number of portions starting with the said discrete portion up to and including any particular portion if sent at a said nominal data transmission rate,
 wherein a timing error value for a portion up to and including the particular portion when sent at a said data transmission rate is the difference between (a) the time needed to transmit at the said data transmission rate, the said portion for which the timing error is being computed and zero or more consecutive subsequent portions up to and including the said particular portion, and (b) the difference between the playing instant of the said particular portion and the playing instant of the portion preceding the said portion for which the timing error value is being computed.

14. A non-transitory storage medium for storing an audio recording comprising: a plurality of encoded versions of the same audio sequence, wherein each version comprises a plurality of discrete portions of data and each version corresponds to a respective different degree of compression; and for each discrete portion of each version and for each of a plurality of nominal data transmission rates, a maximum timing error value for a said discrete portion, being the maximum of a set of timing error values for any number of portions starting with the said discrete portion up to and including any particular portion if sent at a said nominal data transmission rate,
 wherein a timing error value for a portion up to and including the particular portion when sent at a said data transmission rate is the difference between (a) the time needed to transmit at the said data transmission rate, the said portion for which the timing error is being computed and zero or more consecutive subsequent portions up to and including the said particular portion, and (b) the difference between the playing instant of the said particular portion and the playing instant of the portion preceding the said portion for which the timing error value is being computed.

15. An apparatus for transmitting an encoded sequence over a network to a terminal, comprising:
 a store storing a plurality of encoded versions of the same sequence, wherein each version comprises a plurality of discrete portions of data and each version corresponds to a respective different degree of compression;
 a transmitter; and
 control means operable to receive data as to the data rate permitted by the network and data as to the content state of a receiving buffer at the terminal and, for at least one candidate version, to compute in respect of one or more discrete portions thereof as yet unsent the maximum timing error value of a set of timing error values for any number of portions starting with the said discrete portion up to and including any particular portion if sent at the permitted data transmission rate, to compare the determined maximum timing error value with the ability of the receiving buffer to accommodate said maximum timing error value with its buffer content state and to select one of said versions for transmission, in dependence on the results of said comparisons,
 wherein a computed timing error value for a portion up to and including the particular portion when sent at a said data transmission rate is the difference between (a) the time needed to transmit at the said data transmission rate, the said portion for which the timing error is being computed and zero or more consecutive subsequent portions up to and including the said particular portion, and (b) the difference between the playing instant of the said particular portion and the playing instant of the portion preceding the said portion for which the timing error value is being computed.

16. An apparatus for transmitting an encoded sequence over a network to a terminal, comprising:
 a store storing a plurality of encoded versions of the same sequence, wherein each version comprises a plurality of discrete portions of data and each version corresponds to a respective different degree of compression, each version including, for each of a plurality of nominal data transmission rates, in respect of one or more discrete portions thereof, the maximum timing error value of a set of timing error values for any number of portions starting with the said discrete portion up to and including any particular portion if sent at a said nominal data transmission rate;
 a transmitter; and
 control means for receiving data as to the data transmission rate permitted by the network and data as to the content state of a receiving buffer at the terminal and, for at least one candidate version, to use the permitted data rate and the stored maximum timing error values to estimate a respective maximum timing error value corresponding to said permitted data rate, to compare the estimated maximum timing error values with the ability of the receiving buffer to accommodate each said estimated maximum timing error with its buffer content state and to select one of said versions for transmission, in dependence on the results of said comparisons,
 wherein a computed timing error value for a portion up to and including the particular portion when sent at a said data transmission rate is the difference between (a) the time needed to transmit at the said data transmission rate, the said portion for which the timing error is being computed and zero or more consecutive subsequent portions up to and including the said particular portion, and (b) the difference between the playing instant of the said particular portion and the playing instant of the portion preceding the said portion for which the timing error value is being computed.

* * * * *